US008321577B2

(12) United States Patent
Eriksson

(10) Patent No.: US 8,321,577 B2
(45) Date of Patent: Nov. 27, 2012

(54) METHOD FOR PROVIDING MESSAGING USING APPROPRIATE COMMUNICATION PROTOCOL

(75) Inventor: Anders Eriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 694 days.

(21) Appl. No.: 12/089,173

(22) PCT Filed: Oct. 4, 2005

(86) PCT No.: PCT/SE2005/001460
§ 371 (c)(1),
(2), (4) Date: Aug. 20, 2008

(87) PCT Pub. No.: WO2007/040428
PCT Pub. Date: Apr. 12, 2007

(65) Prior Publication Data
US 2009/0172119 A1    Jul. 2, 2009

(51) Int. Cl.
*G06F 15/16* (2006.01)
*G06F 12/00* (2006.01)
(52) U.S. Cl. ........................................ 709/230
(58) Field of Classification Search .......... 709/230, 709/231–239
See application file for complete search history.

(56) References Cited

U.S. PATENT DOCUMENTS

| 5,581,743 | A  | * | 12/1996 | Burton et al. ............... 703/26 |
| 6,956,860 | B1 | * | 10/2005 | Colban .......................... 370/401 |
| 7,095,367 | B2 | * | 8/2006 | Fujikawa et al. ............ 342/176 |
| 7,522,631 | B1 | * | 4/2009 | Brown et al. ................. 370/466 |
| 2001/0030944 | A1 | * | 10/2001 | Kato ............................... 370/237 |
| 2002/0161511 | A1 | * | 10/2002 | Fujikawa et al. ............ 701/200 |
| 2004/0001224 | A1 |   | 1/2004 | Kajiwara |
| 2004/0205124 | A1 |   | 10/2004 | Limprecht et al. |
| 2005/0276221 | A1 | * | 12/2005 | Olesinski et al. ............ 370/235 |
| 2007/0058670 | A1 | * | 3/2007 | Konduru et al. ............. 370/466 |
| 2009/0116487 | A1 | * | 5/2009 | Read ............................ 370/392 |

FOREIGN PATENT DOCUMENTS

| JP | 2004-015126 | 1/2004 |
| KR | 2002-0036356 | 5/2002 |
| WO | WO 2004/095796 | 11/2004 |

OTHER PUBLICATIONS

International Search Report for PCT/SE2005/001460 mailed May 19, 2006.
Chinese Office Action dated Mar. 10, 2010 (15 pages).
W. Richard Stevens, "TCP/IP Illustrated, vol. 1: The Protocols", Addison-Wesley, 1994, pp. 34-40.
Israel Cidon et al., "Hybrid TCP-UDP Transport for Web Traffic", Sun Microsystems, Inc., Palo Alto, CA, Jan. 1999, pp. 8-33.
European Office Action dated Sep. 21, 2012 in related European application No. 05 789 969.2 (9 pages).

* cited by examiner

*Primary Examiner* — Zarni Maung
(74) *Attorney, Agent, or Firm* — Nixon & Vanderhye P.C.

(57) ABSTRACT

The invention relates to a low latency transport of an Internet message over a connection from an Internet message-sending node to an Internet Message-receiving node. Said Internet Message-sending node determines the size of the Internet message (40) and compares the size of with a pre-determined single-packet threshold (42). Thereafter, the Internet Message-sending node performs a TCP Internet message-transport (44) over said connection if the size of the Internet message is larger than said single-packet threshold, and a single-packet (UDP) Internet message-transport (45, 46) if the size of the Internet message is smaller than said single-packet threshold.

35 Claims, 6 Drawing Sheets

METHOD FOR PROVIDING MESSAGING USING APPROPRIATE COMMUNICATION PROTOCOL

This application is the U.S. national phase of International Application No. PCT/SE2005/001460, filed 4 Oct. 2005, which designated the U.S., the entire contents of that application is hereby incorporated by reference.

TECHNICAL FIELD OF THE INVENTION

The present invention relates to an optimised, low latency transport of Internet messages, i.e. e-mail messages.

BACKGROUND OF THE INVENTION

Communication via Internet messages is widely used today, and may be performed between computer terminals, e.g. personal computers or PDAs, connected to the Internet over wireless or wire-lined connections. A mobile terminal, e.g. a cellular telephone connected to a wireless radio access network, may also be capable of sending and receiving e-mails to and from another mobile terminal or a computer terminal connected to the Internet.

The commonly used SMTP (Simple Mail Transfer Protocol) provides a reliable transport of Internet messages, of any size, between an SMTP-client, i.e. an Internet message sender, and an SMTP-server, i.e. an Internet message receiver, typically by means of the packet-switched and connection oriented TCP (Transmission Control Protocol), and any mobile terminal or computer capable of e-mail communication can be arranged to function as an SMTP-client, as well as an SMTP-server.

An Internet message, i.e. an e-mail message, comprises a set of headers containing information regarding the sender, the intended recipient or recipients, and the subject of the message, while the message itself is contained in a body appended to the headers. An SMTP/TCP Internet message is further prepended by an envelope, which assists in the routing of the message through a set of intermediate nodes, enabling a so-called hop-by-hop-delivery of the message. Each sender makes a routing lookup and forwards the message to the next-hop server, which repeats the process until the message is delivered to its intended recipients, and on originating sender may be arranged to by-pass the routing step and forward all messages to the same next-hop server, which performs the necessary routing for the onward transport of the message.

The sender and the recipient/s/ of an Internet message are commonly referred to as MUAs (Message User Agents), and may be e.g. a personal computer terminal, and at least some of the intermediate nodes are commonly referred to as MTAs (Message Transfer Agents) e.g. a server. Each server acting as MTA in a SMTP/TCP hop-by-hop delivery of an Internet message is capable of functioning both as an SMTP-client and an SMTP-server for a transported message, and will function as an SMTP-server when receiving an Internet message from a MUA or from another MTA, and function as an SMTP-client when forwarding the Internet message to a second MTA. A MUA is capable of functioning as an SMTP-client when transmitting an e-mail to an MTA.

The latency, or delay, of a connection between two nodes defines the time it takes for a data packet to be transported between the nodes, and a high latency connection induces a comparatively longer delay, or latency, in the data packet transport than a low latency connection. A wireless radio access network, e.g. according to the GPRS (Global Packet Radio Service)/GSM (Global System for Mobile communications) or a 3G/UTRAN (Universal Mobile Telecommunications Systems Terrestrial Radio Access Network) is regarded a high latency network, and the latency between a mobile terminal and a server is approximately 0.5-1.3 second, while a wired connection normally induces a smaller delay and is regarded a low latency connection. Thus, the above-described wireless terrestrial links, as well as interplanetary links, are examples of high latency connections.

The TCP (Transport Control Protocol) is a connection-oriented protocol, providing a reliable transmission of data in an IP environment, and the SMTP/TCP is commonly used in the transport of e-mail messages. The TCP provides stream data transfer, reliability, efficient flow control, full-duplex operation, and multiplexing. The stream data transfer of the TCP delivers an unstructured stream of bytes, and the applications or application layer programs do not have to pack the data for the transmission in a packet data network. Further, the TCP offers reliability by providing end-to-end packet delivery by sequencing bytes with an acknowledgment number that indicates to the source the next byte the destination expects to receive, and any bytes not acknowledged within a specified time interval are retransmitted. The reliability mechanism of TCP is capable of handling lost, delayed, duplicated, or misread packets, wherein a time-out mechanism detects lost packets and request retransmission. The TCP offers efficient flow control, and the full-duplex operation allows the TCP to perform transmission and reception simultaneously. Thus, the TCP enables a very reliable communication of e-mail messages of any size over the Internet.

However, the reliable SMTP/TCP transport of an e-mail between two nodes requires several protocol exchanges, i.e. round-trips, between the STMP-client and the STMP-server, involving an IP packet transmission from the SMTP-client to the SMTP-server, followed by an IP packet transmission in the opposite direction, from the SMTP-server to the SMTP-client, e.g. an acknowledgement or a reply. Since each transmission in any direction induces a latency, which is added to the total transport time of the e-mail, a SMTP/TCP e-mail transport over a high latency connection will be comparatively slow. Consequently, SMTP/TCP transport of an Internet message over a high latency connection, e.g. in a wireless radio access network, will result in a comparatively long overall transmission time between the sender and the recipient of the Internet message.

Thus, a major drawback with the prior art SMTP/TCP is the high number of round trips required between the client and the server, which increases the overall transmission time of an Internet message, especially over high latency connections, such as in a wireless radio access network.

Therefore, an aim of one or more aspects the present invention is to alleviate the problems described above relating to the SMTP/TCP e-mail transport over high latency connections, and to achieve a lower overall transmission time between the sender and the recipient of an e-mail message, which is particularly advantageous in wireless radio access networks.

SUMMARY OF THE INVENTION

It is an object of the present invention to provide an optimised e-mail transport, reducing the latency and the overall transmission time of an Internet message between a sender and a recipient, applicable e.g. in wireless radio access networks, comprising high-latency connections.

These and other objects are achieved by a method in an Internet message-sending node, a method in an Internet message-receiving node, and a device arranged to function as an Internet message-sending node.

An example solution according to the invention basically involves the Internet message sender determining the size of an e-mail message and packing smaller sized messages into a single data packet, e.g. in a UDP (User Datagram Protocol) packet, and transporting the single data packet to the Internet message receiver fragmented into one or more IP packets. The Internet message receiver acknowledges the reception of the UDP packet by sending an acknowledgement back to the Internet message sender, and the Internet message sender retransmits the UDP packet, if no acknowledgement is received. Larger sized messages are, however, transported by means of the TCP.

One or more aspects of the invention relate to a method in an Internet Message-sending node for transporting an Internet message over a connection to an Internet Message-receiving node, the Internet Message-sending node performing the following steps:

Determining the size of the Internet message;
Comparing the size of the Internet message with a pre-determined single-packet threshold;
Performing a TCP Internet message-transport over said connection, if the size of the Internet message is larger than said single-packet threshold.
Performing a single-packet Internet message-transport over said connection, if the size of the Internet message is smaller than said single-packet threshold.

The above-mentioned step of performing a single-packet Internet message-transport may comprise the following sub-steps:

Packing the Internet Message into a single data packet;
Fragmentation of said single data packet into one or more IP packets;
Transmitting said IP packets to the Internet message-receiving node;
Performing a retransmission if no acknowledgement is received from the Internet message-receiving node within a time-out interval.

Optionally, a single-packet Internet message-transport or a TCP Internet message-transport may be performed over said connection, in case the size of the Internet message substantially corresponds to said single-packet threshold.

Further, a compression of the Internet message may be performed, and the size of the Internet message may be compared with a pre-determined compression threshold before performing said compression, wherein a Deflate-algorithm may be used in said compression.

The single packet Internet message-transport may be performed according to the UDP (User Datagram Protocol), and said single packet threshold may be settable within an interval between 1.5 kbyte and 64 kbyte.

One or more aspects of the invention relate to a method in an Internet Message-receiving node for receiving an Internet message transported over a connection from said Internet Message-sending node, in which the Internet Message-receiving node sends an acknowledgement of a received single data packet over the connection to the Internet Message-sending node.

Said connection may be a wireless radio connection or a wire-line connection.

Aspects of the invention also relate to a device arranged to function as an Internet Message-sending node for transporting an Internet message over a connection to an Internet Message-receiving node. The device comprises:

Determination means for determining the size of the Internet message;
Comparison means for comparing the size of the Internet message with a pre-determined single-packet threshold;
TCP transporting means for performing a TCP Internet message-transport to the Internet Message-receiving node, in case the size of the Internet message is larger than said single-packet threshold; and
Single-packet transporting means for performing a single-packet Internet message-transport to the Internet Message-receiving node, in case the size of the Internet message is smaller than said single-packet threshold.

Said single-packet transporting means may comprise:
Packing means for packing the Internet Message into a single data packet;
Fragmentation means for fragmentation of said single data packet into one or more IP packets;
Transmitting means for transmitting said IP packets to the Internet message-receiving node;
Retransmission means for performing a retransmission if no acknowledgement is received from the Internet message-receiving node within a time-out interval.

Optionally, the single packet transporting means may be arranged to perform a single-packet Internet message-transport over said connection, or the TCP transporting means may be arranged to perform a TCP Internet message-transport over said connection, if the size of the Internet message substantially corresponds to said single-packet threshold.

Said connection may be a wireless radio connection or a wire-line connection.

The device may further comprise compression means for performing a compression of the Internet message, and the compression means may utilize a Deflate-algorithm.

The single-packet transporting means may be arranged to use the UDP (User Datagram Protocol), and said single packet threshold may be settable within an interval between 1.5 kbyte and 64 kbyte.

The device may be further arranged to function as an Internet Message-receiving node, by further comprising acknowledging means for sending an acknowledgement of a received single data packet over the connection to the Internet Message-sending node.

Additionally, the device may be further arranged to function as to function as an SMTP-client, as well as an SMTP-server.

Said device may be a server, a mobile terminal adapted to be wirelessly connected to a radio access network, or a computer device adapted to be wire-lined or wirelessly connected to a network.

Other features and further advantages of the invention will be apparent from the following description and figures, as well as from the appended claims.

BRIEF DESCRIPTION OF THE DRAWINGS

The present invention will now be described in more detail and with reference to the embodiments and to the drawings, of which.

DESCRIPTION OF PREFERRED EMBODIMENTS

The terms and expressions used in the description and in the claims are meant to have the meaning normally used by a person skilled in the art.

Figure 1:
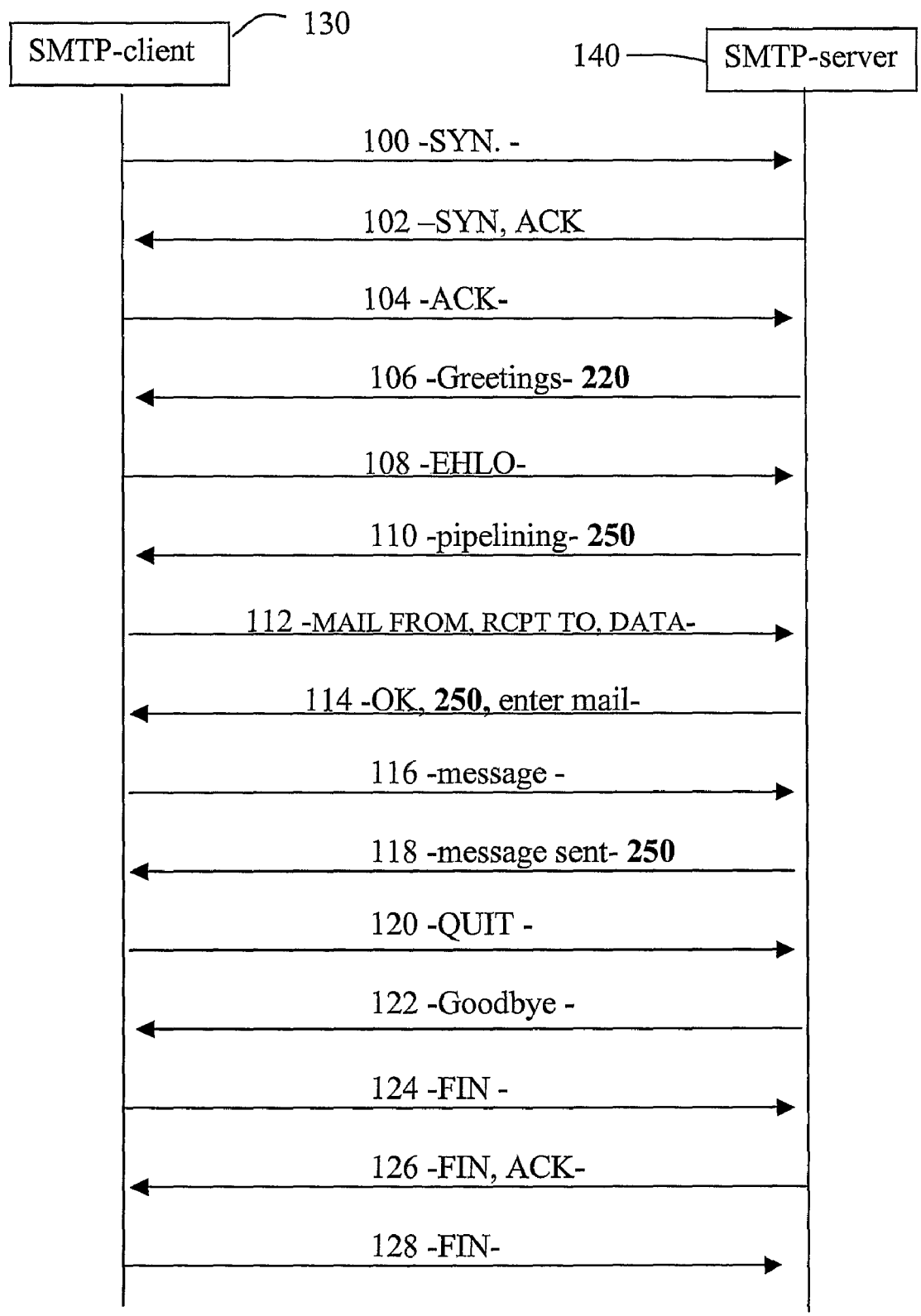
FIG. 1 is a signalling diagram illustrating a conventional SMTP/TCP e-mail transport.

FIG. 1 is a signaling diagram illustrating the conventional sequential and alternating signal transmission between an STMP-client 130 and an STMP-server 140, according to prior art, in order to transport an e-mail message by means of the SMTP/TCP. The illustrated SMTP/TCP e-mail transport, or SMTP/TCP Internet Message transport, uses pipelining, which allows batching of some of the operations, thereby reducing the number of transmissions. However, even though pipelining is used, a SMTP/TCP e-mail transport of a message from a client to a server requires several protocol exchanges between the client and the server, and in the illustrated embodiment at least seven round-trips are required for transporting an e-mail message.

Some of the SMTP commands illustrated in FIG. 1 are the following:

EHLO: Introduction and requesting extended mode, (Step 108 in FIG. 1),

MAIL FROM: Specification of the sender, (Step 112 in FIG. 1),

RCPT TO: Specification of the recipient, (Step 112),

DATA: Indication that the client is ready and desires to send an Internet message, (Step 112), QUIT: Quit the session, (Step 120 in FIG. 1)

The signaling steps 100, 102 and 104 in FIG. 1 perform a conventional handshaking procedure in order to establish a connection between the SMTP-client and the SMTP-server, and in step 106 the numeral "220" indicates that the SMTP-service is ready. In step 110, the numeral "250" indicates that the requested command is successful, and further initiates pipelining. In step 114, the SMTP-server indicates that the sender and recipient are successfully received, and that a message should be entered. In step 116, the SMTP-client transmits the actual e-mail message, and in step 118 the SMTP-server responds with "250", indicating that the message is sent. The remaining steps 120, 122, 124, 126 and 128 end the session and the connection between the SMTP-client and the SMTP-server.

A conventional SMTP/TCP Internet message transport, as illustrated in FIG. 1 and described above, provides a very reliable transport of e-mail messages of any size. However, in case of a high latency connection between the SMTP-client 130 and the SMTP-server 140, a correspondingly high latency, is induced in the overall latency between the sender and the recipient, i.e. seven times the inherent latency of the connection, due to the seven roundtrips required.

This invention provides a low latency transport of Internet messages by means of a new and improved mail transfer protocol, hereinafter referred to as LLMTP (Low Latency Mail Transport Protocol), which transmits comparatively long e-mail messages by means of the TCP, but transports comparatively smaller e-mail messages by means of a suitable connection-less transport protocol, e.g. the UDP (User Datagram Protocol). In LLMTP/UDP, the Internet message is packed into a UDP packet, together with the routing information, and the UDP packet is transported between the Internet message sender and the Internet message receiver, fragmented into the required number of IP packets.

In order to decide whether an e-mail message should be transported by means of the LLMTP/UDP, the size of the Internet message is determined and compared with a predetermined single packet threshold, which may be settable by a system operator, e.g. within the interval 1.5-64 kbyte, depending on the particular environment. In case the size of the Internet message is larger than the single packet threshold, the Internet message is transmitted by means of a TCP Internet message-transport, and in case the size of the Internet message is smaller than the threshold, the envelope, set of headers and body are packed into a single data packet, e.g. a UDP packet, and transmitted by means of a LLMTP/UDP Internet message-transport. In case the size of the e-mail message substantially corresponds to the single packet threshold, the selection between the TCP and the UDP is optional.

When the Internet message receiver receives the single data packet sent from the Internet message sender, e.g. a UDP packet, the Internet message receiver acknowledges the reception by sending an acknowledgement back to the Internet message sender. If the Internet message sender does not receive any acknowledgement of the reception during a time out interval, the Internet message sender retransmits the UDP packet.

The UDP is an example of a suitable transport protocol, since it does not involve any handshaking procedure and is a connectionless transport-layer protocol that is useful in situations where the reliability mechanisms of TCP are not necessary. However, other suitable transport protocols may be applied.

Figure 2:
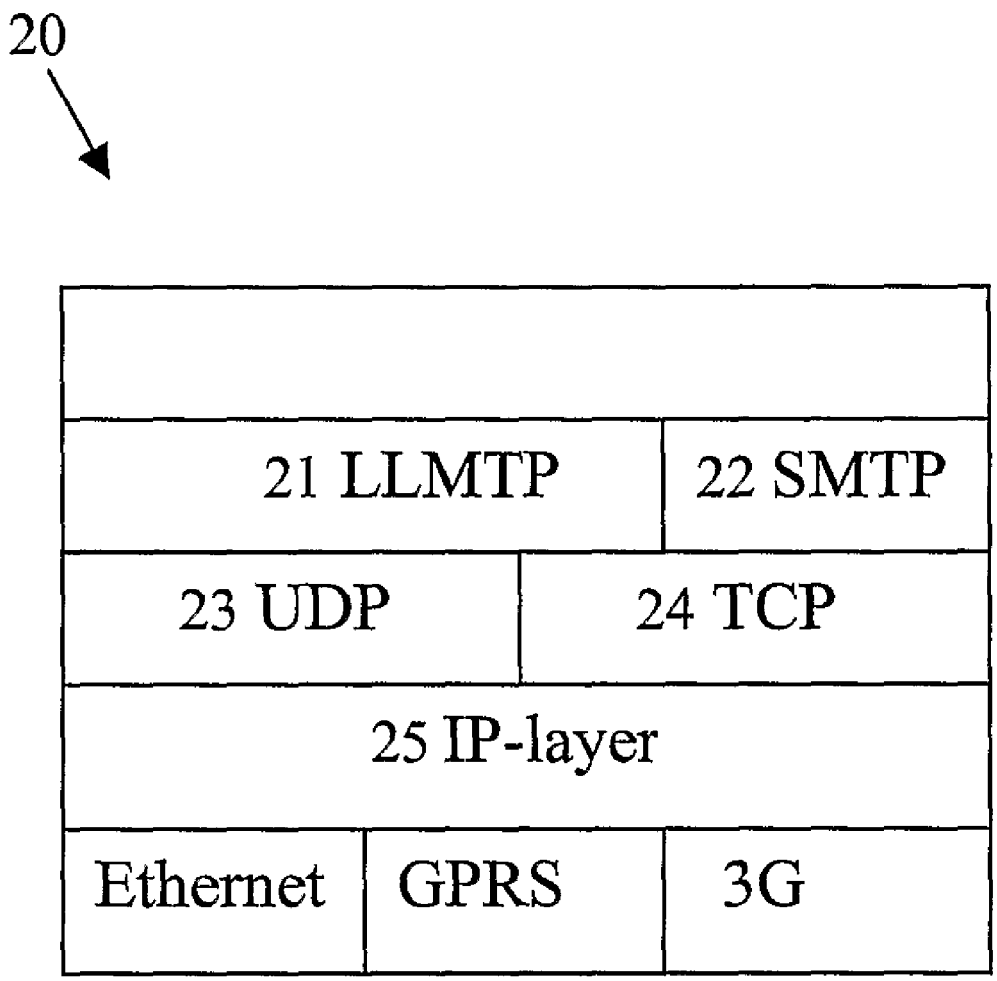
FIG. 2 is an IP-stack comprising a new Low Latency Mail Transfer Protocol (LLMTP) layer, FIG. 3 schematically illustrates packing of an e-mail message into a single data packet, e.g. an UDP packet.

FIG. 2 schematically illustrates an extended IP-stack, according to this invention, comprising an IP-layer 25, a UDP layer 23 and a TCP layer 24, and the new Low Latency Mail Transfer Protocol (LLMTP)-layer 21, the LLMTP requiring less round-trips than the conventional SMTP 22 for transporting an e-mail message.

Figure 3:
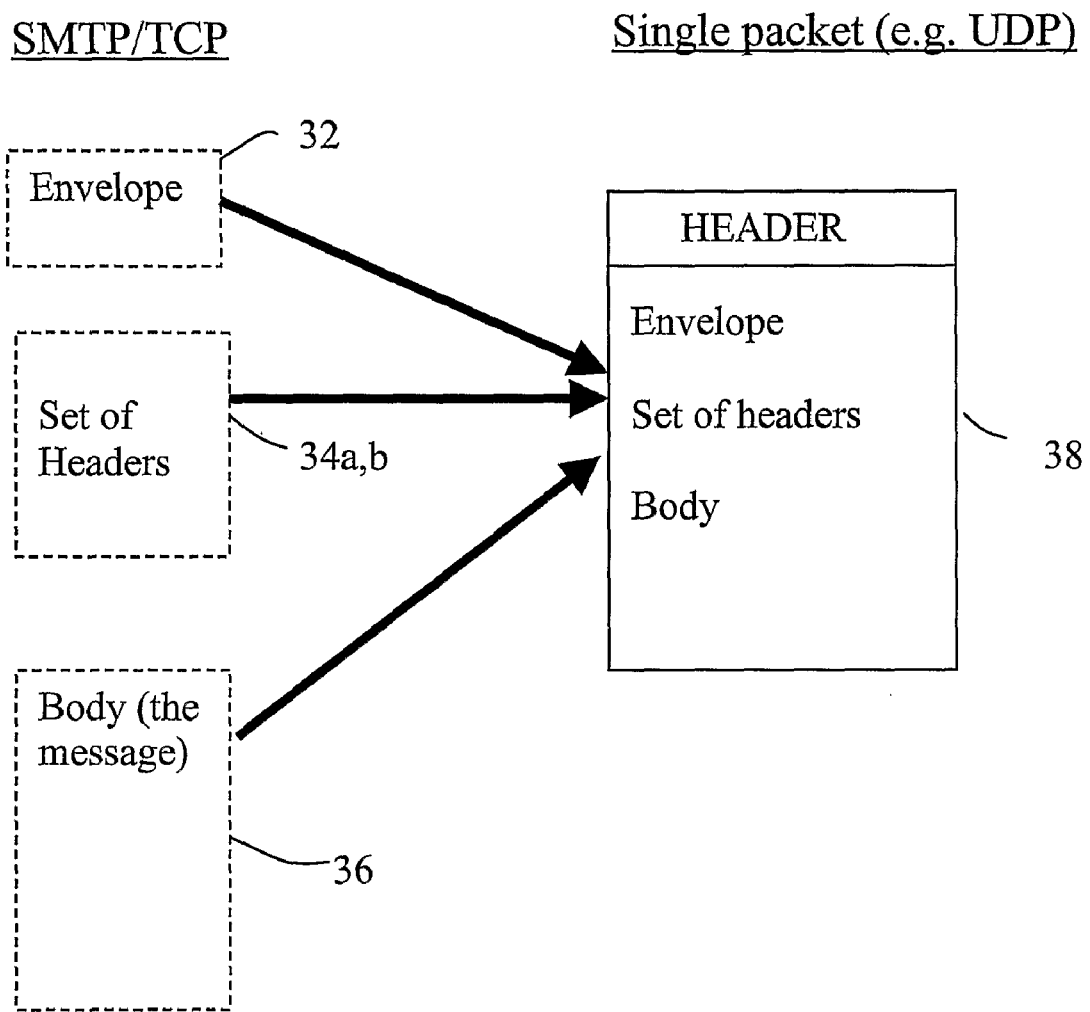

FIG. 3 illustrates packing of the envelope, set of headers and body of an e-mail message into one single data packet, e.g. a UDP packet. In the embodiment illustrated in this figure, an SMTP/TCP Internet message includes an envelope 32, a set of headers 34, and a body 36. The envelope 32 contains routing information regarding the e-mail message, and may have a size of e.g. approximately 50 byte. The set of headers 34 contain information regarding the sender and the recipient of the Internet message, as well as of the subject, and may have a size of e.g. approximately 50 byte, while the body 36 contains the actual message. According to this invention embodiment, an Internet message that is sufficiently small, i.e. smaller than a predetermined single packet threshold, will be packed into a single data packet 38, e.g. a UDP packet, which will contain the information of the envelope 32, set of headers 34 and the body 36. Thus, the entire Internet message, as well as the routing information, will be contained into one single data packet 38, as illustrated in this figure, the single data packet being fragmented into one or more IP packets for the transmission.

A UDP packet has a maximum size of 64 kbyte, while an IP-packet, e.g. an Ethernet-packet, has a size of only 1.5 kbyte. Normally, a UDP-packet, having a size of less than 1.5 kbyte, is transported in only one IP packets, while a UDP packet larger than 1.5 kbyte is transported in several IP packets. For example, a 4.5 kbyte UDP packet will be transported from a Node 1 to a Node 2 fragmented into three IP packets, each IP packet having a size of 1.5 kbyte. When all three IP packets are received by Node 2, the UDP packet will be recreated, and the Node 2 will send an acknowledgement back to Node 1. Preferably, the Node 1 will retransmit the UDP packet, in case no acknowledgement is received within a time-out interval. The probability of a failed transmission increases with the number of IP packets that are required to accommodate the UDP packet, and the number of retransmissions will, therefore, increase with the size of the UDP packet. A suitable size for the single packet threshold will depend on the reliability of the transmission, and the single packet threshold is preferably settable by the system operator, with a default value of e.g. between 1.5 kbyte and 64 kbyte.

Figure 4:
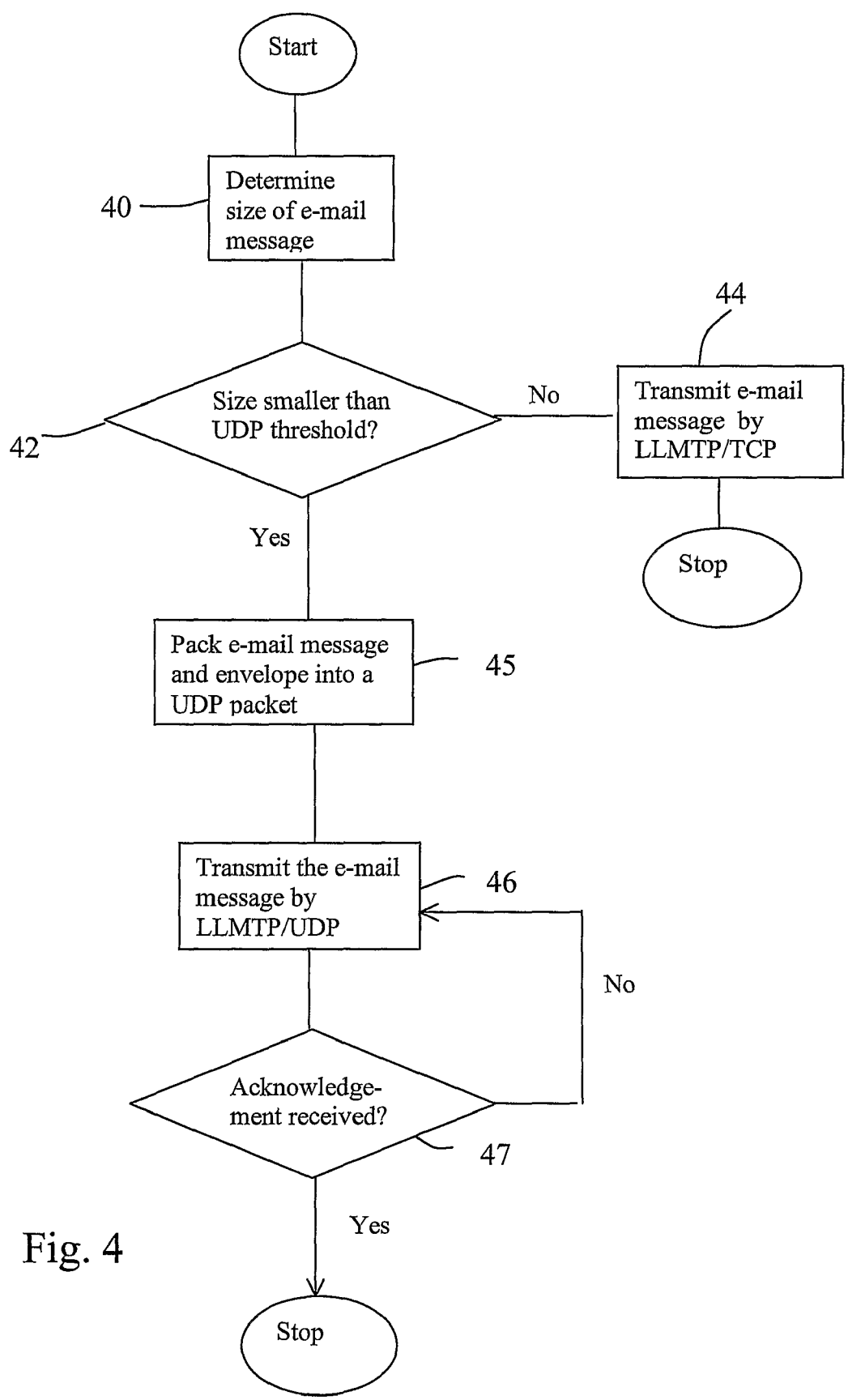
FIG. 4 is a flow diagram illustrating the e-mail transport according to a first embodiment of the invention.

FIG. 4 is a flow diagram illustrating an exemplary embodiment of the low latency mail transport according to the invention, in which large e-mails are transported according to the TCP, i.e. LLMTP/TCP, but e-mails having a smaller size, e.g. occupying less than 64 kbyte, are packed into a single data packet, e.g. a UDP packet, and transported fragmented into one or more IP packets. The flow diagram illustrates the steps performed by an Internet message-sending node, according to this embodiment of the invention, when an e-mail message is transmitted to an Internet Message-receiving node. In step 40, the Internet message sender determines the size of the Internet message, i.e. the size of the packed format of the envelope, the block of headers and the body. Step 42 compares the size with a pre-determined single packet (UDP) threshold, and determines whether the size is smaller than said threshold, which may e.g. be settable by a system operator within an interval between 1.5 kbyte and 64 kbyte. If not, the e-mail message is transmitted according to the LLMTP/TCP, in step 44. However, if the size of the e-mail message is smaller than said threshold, the e-mail message and the routing information, i.e. the envelope, the block of headers and the body, are packed into one single data packet, according to any suitable connectionless transport protocol, e.g. the UDP, in step 45. In step 46, the e-mail message is transmitted according to the LLMTP/UDP, in which the single data packet is fragmented into the required number of IP packets, to be transmitted from the Internet message sender to the Internet message receiver. In step 47 is determined whether any acknowledgement (ACK), issued by the Internet message receiver upon reception of the UDP packet, has been received by the Internet message sender within the time-out interval. If no, the e-mail message is retransmitted, and steps 46-47 performed again, and if yes, the e-mail transport is complete.

As illustrated in this flow diagram only one round-trip is required between the Internet message sender and the Internet message receiver in the LLMTP/UDP transport of an e-mail message, as compared to the at least seven round-trips required when transporting an e-mail message according the conventional SMTP/TCP. Thereby, the user of the Internet Message-sending terminal will receive an acknowledgement faster, while the overall latency, i.e. delay, is reduced, as well as the power consumption.

According to an alternative embodiment, the Internet Message sender will perform step 45, i.e. the packing in one single packet, if the size of the e-mail message is smaller than, or equal to, the size of the single packet threshold.

According to a further embodiment of the invention, the Internet message is compressed by means of any suitable compression method, e.g. using a Deflate-algorithm, and the compression may be preceded by comparing the size of the Internet message with a predetermined compression threshold, which may be settable by the system operator.

Figure 5:
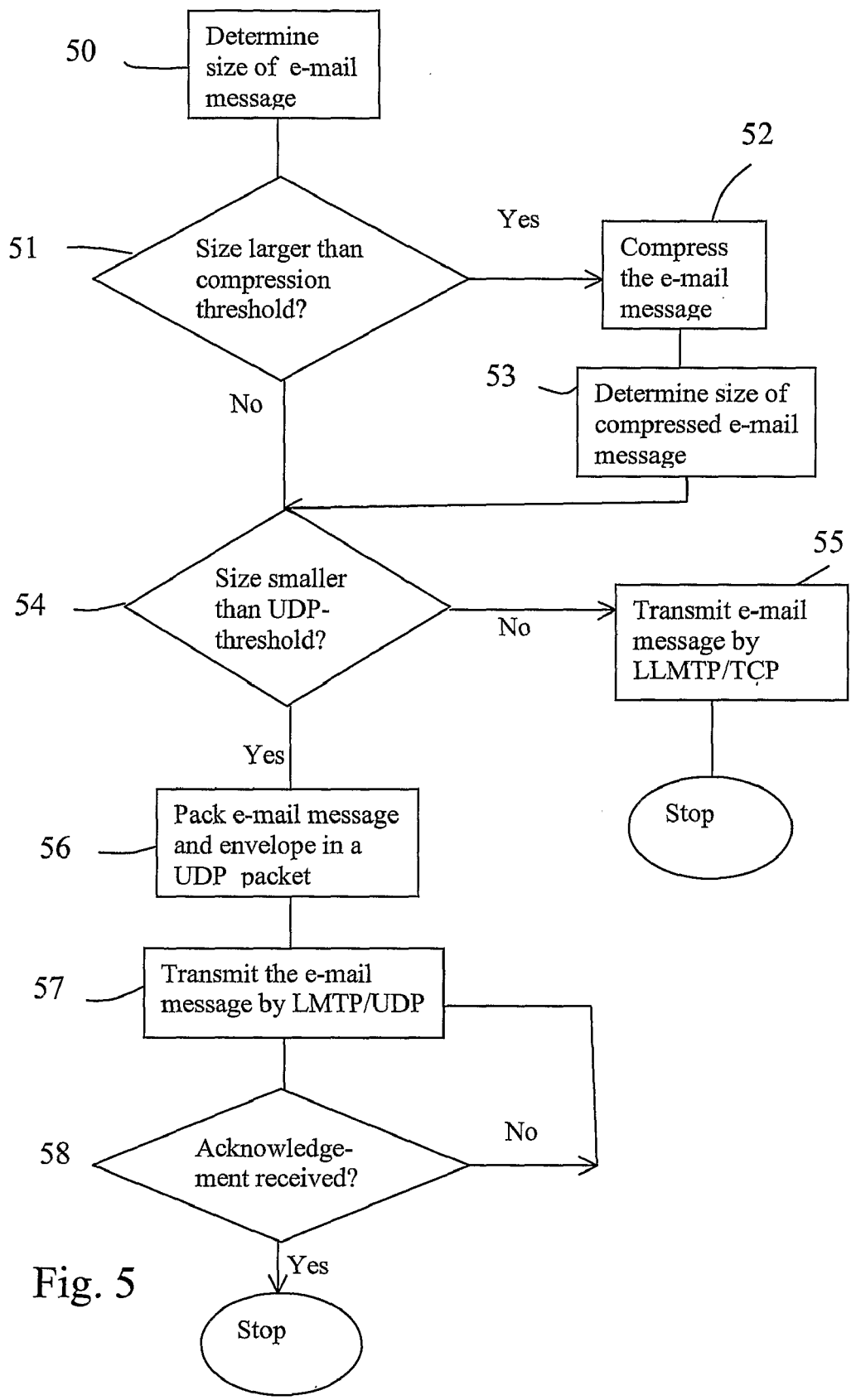
FIG. 5 is a flow diagram illustrating the e-mail transport according to a second embodiment of the invention, using compression of the e-mail message.

FIG. 5 is a flow diagram illustrating a second embodiment of this invention, in which e-mail messages larger than a predetermined compression threshold are compressed by means of any suitable compression method, e.g. using a Deflate-algorithm. Thereafter, the e-mail message is compared with the single packet threshold, and in case the compressed e-mail message is smaller than the single packet threshold, the message is transported by means of LLMTP/UDP, otherwise the compressed e-mail is transported by means of LLMTP/TCP.

In step 50, the Internet Message sender determines the size of the e-mail message. In step 51, the size is compared with a pre-determined compression threshold, to determine whether the size is above said threshold. If yes, a compression procedure, e.g. according to a deflate-algorithm, is performed in step 52, and in step 53, the size of the compressed e-mail message is determined. Step 54 compares the size with the predetermined UDP (single packet) threshold, and determines whether the size is below said threshold. If no, the e-mail message is transported to the Internet message receiver according to the LLMTP/TCP. If yes, the e-mail message and the routing information, i.e. the envelope, the block of headers and the body, are packed into a single data packet, e.g. a UDP packet, in step 56. In step 57, the e-mail message is transmitted according to the LLMTP/UDP, in which the single data packet is fragmented into the required number of IP packets, to be transmitted from the Internet Message sender to the Internet Message receiver. In step 58 is determined whether any acknowledgement (ACK), issued by the Internet Message receiver upon reception of a single (UDP) packet, has been received by the Internet Message sender within the time-out interval. If yes, the e-mail transport is complete, but if no, the Internet message is retransmitted and the steps 57-58 performed again, until the e-mail transport is complete.

According to an alternative embodiment, the Internet Message sender will perform step 56, i.e. the packing in a single packet, if the size of the e-mail message, or of the compressed e-mail message, is smaller than, or equal to, the size of the single packet threshold.

An Internet message-sending node, according to this invention, is preferably arranged to function as a conventional SMTP-client, in case an e-mail message is to be sent or forwarded to an Internet Message-receiving node, which is not arranged to function as an LLMTP-server. Similarly, an Internet Message-receiving node, according to this invention, is preferably arranged to function as a conventional SMTP-server, in case an SMTP/TCP e-mail is received.

Figure 6:
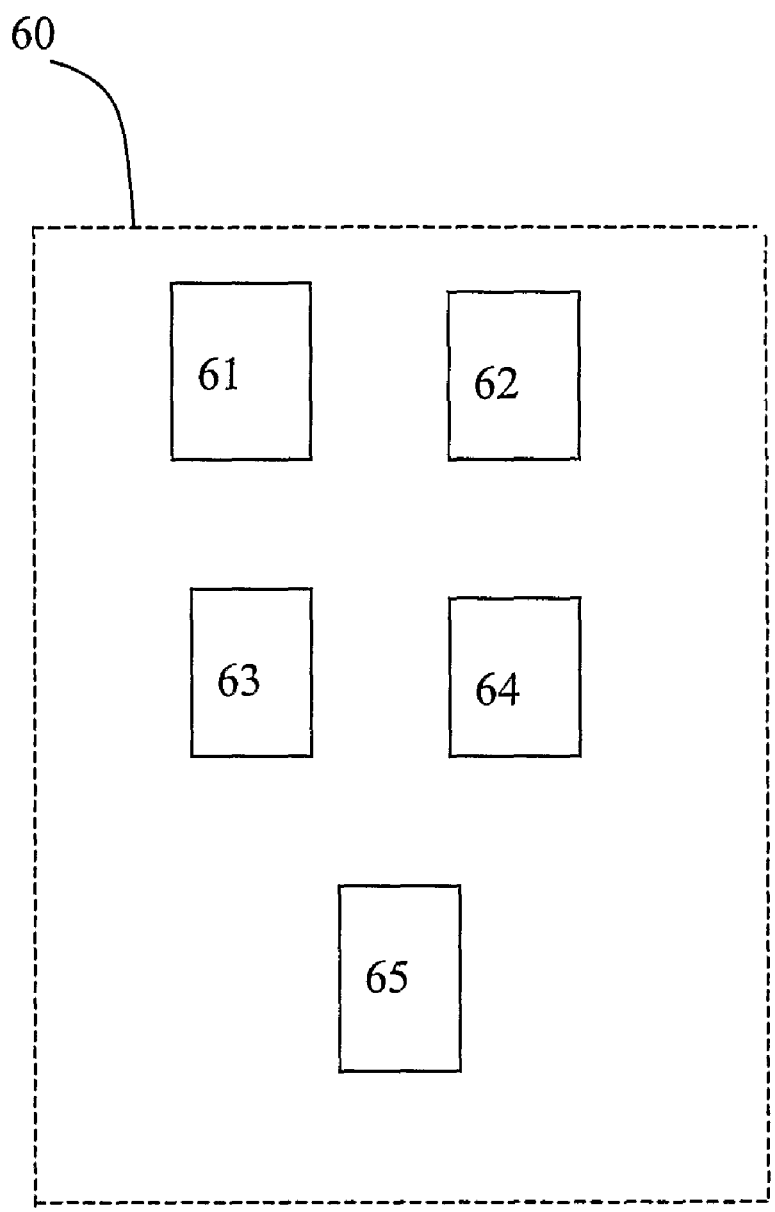
FIG. 6 is a block diagram illustrating an embodiment of the means for implementing the invention.

FIG. 6 is a block diagram illustrating an exemplary embodiment of a device 60 arranged to function as an Internet Message sender according to this invention. The device comprises determination means 61 for determining the size of an e-mail message, comparison means 62 for comparing the size with a predetermined single packet threshold, LLMTP/TCP transporting means 63 for performing a TCP Internet message transport to the server if the size is larger than the threshold, LLMTP/UDP transporting means 64 for performing a LLMTP/UDP Internet message transport if the size of the e-mail message is smaller than said threshold, and compression means 65 for performing compression of the e-mail message.

Another exemplary embodiment of a device 60, not illustrated in the figure, is not provided with any compression means.

The device 60 may e.g. be a mobile terminal connected to a radio access network according to the 2G or 3G, a personal computer connected to the Internet, or a server computer connected to a network.

This invention is applicable in any Internet Message-sending- and/or Internet Message-receiving node, communicating over wireless or wire-lined connections, and the environment may be e.g. a radio access network according to the 2G or 3G, a fixed or mobile computer network, an interplanetary communication link, or an IMS (Internet Protocol Multimedia Subsystem).

The invention has been described with reference to specific exemplary embodiments and figures only to illustrate the inventive concept, and the invention is not limited to the disclosed embodiments. Instead, the invention is intended to cover various modifications within the scope of the appended claims.

The invention claimed is:

1. A method in an Internet Message-sending node for transporting an Internet message over a connection to an Internet Message-receiving node, wherein the Internet Message-sending node performs the following acts:
   determining a size of the Internet message;
   comparing the size of the Internet message with a predetermined single-packet threshold;
   performing a TCP Internet message-transport over said connection, if the size of the Internet message is larger than said single-packet threshold; and
   performing a single-packet Internet message-transport over said connection, if the size of the Internet message is smaller than said single-packet threshold.

2. A method according the claim 1, wherein the act of performing a single-packet Internet message-transport comprising the following:
   packing the Internet Message into a single data packet;
   fragmenting said single data packet into one or more IP packets;
   transmitting said IP packets to the Internet message-receiving node; and
   performing a retransmission if no acknowledgement is received from the Internet message-receiving node within a time-out interval.

3. A method according to claim 1, further comprising performing a single-packet Internet message-transport over said connection, in case the size of the Internet message substantially corresponds to said single-packet threshold.

4. A method according to claim 1, further comprising performing a TCP Internet message-transport over said connection, in case the size of the Internet message substantially corresponds to said single-packet threshold.

5. A method according to claim 1, further comprising performing a compression of the Internet message.

6. A method according to claim 5, further comprising comparing the size of the Internet message with a pre-determined compression threshold before performing said compression.

7. A method according to claim 5, further comprising using a Deflate-algorithm in the compression.

8. A method according to claim 1, further comprising performing the single packet Internet message-transport according to UDP (User Datagram Protocol).

9. A method according to claim 1, wherein the single packet threshold is settable within an interval between 1.5 kbyte and 64 kbyte.

10. A method according to claim 1, wherein said connection is a wireless radio connection.

11. A method according to claim 1, wherein said connection is a wire-line connection.

12. A device arranged to function as an Internet Message-sending node for transporting an Internet message over a connection to an Internet Message-receiving node, the device comprising:
   determination means for determining a size of the Internet message;
   comparison means for comparing the size of the Internet message with a pre-determined single-packet threshold;
   TCP transporting means for performing a TCP Internet message-transport to the Internet Message-receiving node, in case the size of the Internet message is larger than said single-packet threshold; and
   single-packet transporting means for performing a single-packet Internet message-transport to the Internet Message-receiving node, in case the size of the Internet message is smaller than said single-packet threshold.

13. A device according to claim 12, wherein the single-packet transporting means comprises:
   packing means for packing the Internet Message into a single data packet;
   fragmentation means for fragmentation of said single data packet into one or more IP packets;
   transmitting means for transmitting said IP packets to the Internet message-receiving node; and
   retransmission means for performing a retransmission if no acknowledgement is received from the Internet message-receiving node within a time-out interval.

14. A device according to claim 12, wherein the single packet transporting means is arranged to perform a single-packet Internet message-transport over said connection, if the size of the Internet message substantially corresponds to said single-packet threshold.

15. A device according to claim 12, wherein the TCP transporting means is arranged to perform a TCP Internet message-transport over said connection, if the size of the Internet message substantially corresponds to said single-packet threshold.

16. A device according to claim 12, wherein said connection is a wireless radio connection.

17. A device according to claim 12, wherein said connection is a wire-line connection.

18. A device according to claim 12, further comprising:
   compression means for performing a compression of the Internet message.

19. A device according to claim 18, wherein the compression means utilizes a Deflate-algorithm.

20. A device according to claim 12, wherein the single-packet transporting means is arranged to use UDP (User Datagram Protocol).

21. A device according to claim 12, wherein the single packet threshold is settable within an interval between 1.5 kbyte and 64 kbyte.

22. A device according to claim 12, wherein the device is further arranged to function as an SMTP-client.

23. A device according to claim 12, wherein the device is further arranged to function as an Internet Message-receiving node, characterized in that the device further comprises acknowledging means for sending an acknowledgement of a received single data packet over the connection to the Internet Message-sending node.

24. A device according to claim 23, wherein the device is further arranged to function as an SMTP-server.

25. A device according to claim 12, wherein the device is a server.

26. A device (SO) according to claim 12, wherein the device is a mobile terminal adapted to be wirelessly connected to a radio access network.

27. A device according to claim 12, wherein the device is a computer device adapted to be wire-line connected to a network.

28. A device according to claim 12, wherein the device is a computer device adapted to be wirelessly connected to a network.

29. A method for transporting an Internet message over a connection established between Internet Message sending and receiving nodes, the method comprising:
- the sending node sending the Internet message using a connection-oriented protocol over a packet protocol when the Internet message size is larger than a predetermined message size threshold; and
- the sending node sending the Internet message using a connectionless protocol over the packet protocol when the Internet message size is smaller than the predetermined message size threshold.

30. The method according to claim 29, wherein the connection-oriented protocol is TCP, the connectionless protocol is UDP, and the packet protocol is IP.

31. The method according to claim 29, wherein the Internet message is not a time-sensitive message.

32. The method according to claim 29, wherein the Internet message is an email message comprising an envelop, one or more headers, and a body.

33. The method according to claim 29, wherein the step of the sending node sending the Internet message using the connectionless protocol over the packet protocol comprises:
- the sending node packing the Internet message into a single packet of the connectionless protocol; and
- the sending node fragmenting the single connectionless protocol packet into one or more packets of the packet protocol; and
- the sending node transmitting all of the one or more packet protocol packets over the connection.

34. The method according to claim 29, further comprising after the Internet message is sent using the connectionless protocol over the packet protocol, the sending node resending the Internet message using the connectionless protocol over the packet protocol when no acknowledgment is received from the receiving node within a predetermined time-out interval.

35. The method according to claim 29, further comprising:
- the sending node compressing the Internet message when the Internet message size is larger than a predetermined compression threshold;
- the sending node sending the compressed Internet message using the connection-oriented protocol over the packet protocol when the compressed Internet message size is larger than the predetermined message size threshold; and
- the sending node sending the compressed Internet message using the connectionless protocol over the packet protocol when the compressed Internet message size is smaller than the predetermined message size threshold.

* * * * *